R. H. BOTTS.
WORM SCREW.
APPLICATION FILED NOV. 23, 1918. RENEWED DEC. 19, 1919.
1,347,802.
Patented July 27, 1920.
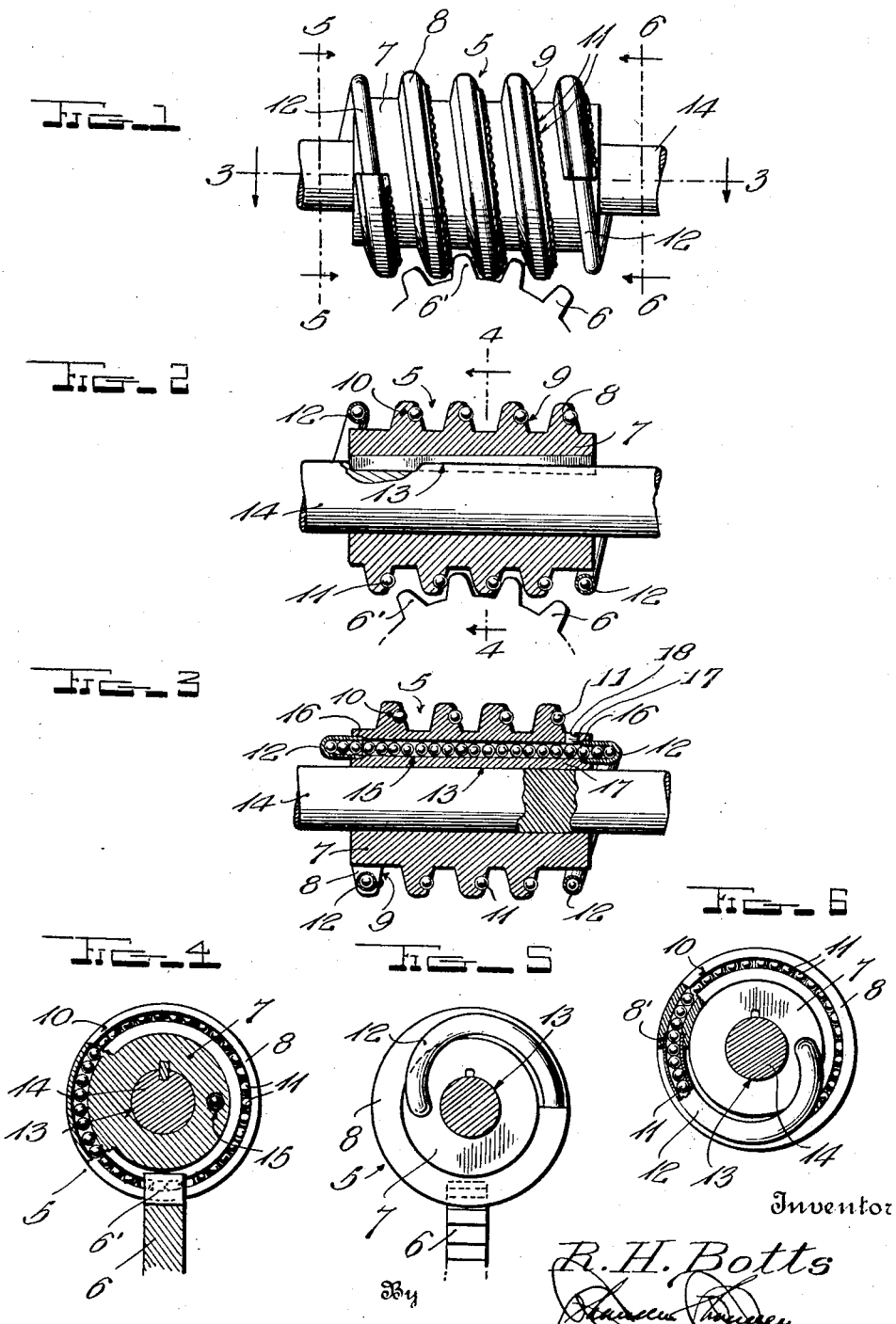
Inventor
R. H. Botts
By
Attorney

UNITED STATES PATENT OFFICE.

ROBERT HENRY BOTTS, OF PARKER, ARIZONA.

WORM-SCREW.

1,347,802. Specification of Letters Patent. Patented July 27, 1920.

Application filed November 23, 1918, Serial No. 263,865. Renewed December 19, 1919. Serial No. 346,172.

*To all whom it may concern:*

Be it known that I, ROBERT H. BOTTS, a citizen of the United States, residing at Parker, in the county of Yuma, State of Arizona, have invented certain new and useful Improvements in Worm-Screws; and I do hereby declare the following to be a full, clear, and exact description of the invention, such as will enable others skilled in the art to which it appertains to make and use the same.

This invention relates to gearing and more particularly to worm and pinion gearing and has for its object the provision of such a gearing in which the worm will be provided with a series of bearing balls carried in its thread for engagement of the pinion teeth so as to give a ball bearing structure between the working faces of the pinion teeth and the worm thread.

Another and principal object of the present invention is to provide a gear of the just described characteristics, which may be quickly and easily made and assembled, so that the structure may be produced at a relatively low cost without unduly expensive processes in its manufacture.

In the drawings:—

Figure 1 is a side elevation of a worm constructed in accordance with the present invention, a pinion being shown engaged therewith.

Fig. 2 is a longitudinal section.

Fig. 3 is a horizontal section on line 3—3 of Fig. 1.

Fig. 4 is a section on line 4—4 of Fig. 2.

Fig. 5 is a section on line 5—5 of Fig. 1 with the worm in end elevation.

Fig. 6 is a section on line 6—6 of Fig. 1 with a part of the worm broken away.

Referring now to the drawings, there is shown a worm 5 constructed in accordance with the present invention with which, in Fig. 1, there is meshed a pinion 6. The worm includes the hub portion 7 which carries the continuous helical thread 8 extending therearound. The normal working face of this thread is indicated at 9, and formed in this working face from one end of the thread to the other there is a continuous channel 10, this channel being arcuate in cross section so as to receive and hold a plurality of bearing balls 11 with the balls projecting out of the channel slightly beyond the working face 9 of the thread 8. The channel 10 opens through the ends of the thread 8, as shown, and the ends of the channel are slightly enlarged as shown at 8' for a purpose to be presently set forth.

In the formation of the worm, the hub 5 thereof is bored centrally as shown at 13, in the usual way to receive the shaft 14, and at one side of the central bore 13 there is bored completely through the hub a longitudinal passage 15 which thus opens through the ends of the hub.

This passage lies at the opposite side of the hub from the terminals of the thread 8, and the ends of the passage 15 are enlarged as shown at 16.

Engaged in the enlargements 8' at the ends of the channel 8, there are a pair of longitudinally curved tubes 12, the curvature of these tubes being such as to bring the other remaining end portions adjacent to the ends of the passage 15, and at these ends of the tubes, the latter have their extremities curved laterally and engaged in the enlarged end portions 16 of the passage. The inner surfaces of the tubes lie flush with the inner surfaces of the passage 15 and of the channel 8, as shown, and thus the tubes and the passage 15 form a continuous return chute between the ends of the channel 10, for the passage of balls therethrough. The ends of the tubes 12 are brazed or otherwise suitably secured to the hub and the thread.

From the foregoing, it will be seen that there is provided a ball race including the channel 10, the passage 15 and the tubes 12, through which the balls 11 move as the device is in operation, the engagement of the balls against the teeth 6' of the pinion 6 causing this movement as the worm 5 is turned.

To permit of the introduction of balls to the passage 15 the hub is bored transversely adjacent to one end as shown at 17, this bore leading from the outer face of the hub to the passage 15 adjacent to one end thereof. The bore 17 is interiorly threaded to receive a filling screw 18.

From the foregoing, it will be seen that I have provided a ball bearing worm, so designed as to be commercially practical, it being possible to form the channel 8 and the passage 15 by well known machining operations, and thus, worms already manufactured or even already in use may be equipped with my invention.

What is claimed is:—

A worm having a hub and a continuous ball receiving and retaining channel in the working face of its thread and opening through the ends of the thread, said channel at its ends being enlarged, said worm having also a passage formed through its hub longitudinally inwardly of the thread, the ends of the passage being enlarged, said passage being located at the opposite side of the central longitudinal axis of the worm from the extremities of the thread, curved tubes each having an end engaged and secured within the enlargements at one end of the passage and having its opposite end secured within the enlargement at the adjacent end of the channel to form a continuous ball race, a plurality of balls disposed in the channel, the passage and the tubes for free movement therethrough, the hub having a transverse threaded passage formed therein opening through its outer face and communicating with the longitudinal passage for the introduction of balls therethrough to the passage, and a removable screw plug engaged in the threaded passage and lying with its inner end flush with the wall of the passage.

In testimony whereof I affix my signature in the presence of two witnesses.

ROBERT HENRY BOTTS.

Witnesses:
M. J. Powers,
Pat. F. Kerns.